United States Patent [19]

Sasaki et al.

[11] Patent Number: 4,768,129

[45] Date of Patent: Aug. 30, 1988

[54] THROUGH TYPE TWIN CAPACITOR

[75] Inventors: Setsuo Sasaki; Mutsuo Koganebuchi; Teruo Taguchi, all of Akita, Japan

[73] Assignee: TDK Corporation, Tokyo, Japan

[21] Appl. No.: 3,136

[22] Filed: Jan. 14, 1987

[30] Foreign Application Priority Data

Jan. 17, 1986 [JP] Japan .................... 61-4760[U]
Feb. 5, 1986 [JP] Japan .................... 61-15583[U]
Apr. 14, 1986 [JP] Japan .................... 61-55916[U]

[51] Int. Cl.$^4$ ........................... H01G 4/42
[52] U.S. Cl. ...................... 361/302; 361/330
[58] Field of Search ............ 361/329, 330, 302, 272

[56] References Cited

U.S. PATENT DOCUMENTS

| | | | |
|---|---|---|---|
| 1,375,982 | 4/1921 | Thomson | 361/272 X |
| 2,983,855 | 5/1961 | Schlicke | 361/302 |
| 3,182,238 | 5/1965 | Toder et al. | 361/272 X |
| 3,555,370 | 1/1971 | Bowling | 361/272 X |
| 4,370,698 | 1/1983 | Sasaki | 361/330 |

*Primary Examiner*—Donald A. Griffin
*Attorney, Agent, or Firm*—Martin M. Novack

[57] ABSTRACT

A through type twin capacitor of higher electric strength has been proposed. In the present capacitor, insulating covers which cover conductive rods passing through ceramic body of the capacitor is extended beyond a lower end of the insulation cover which surrounds the lower portions of the rods, in order to improve the electric strength of the capacitor.

4 Claims, 12 Drawing Sheets

THROUGH TYPE TWIN CAPACITOR

BACKGROUND OF THE INVENTION

The present invention relates to a through type twin high electric strength capacitor and, in particular to a capacitor for the use in the noise filter in a high power and high frequency apparatus, like a microwave oven, a broadcasting transmitter or an X-ray generator.

In a high frequency and high power apparatus operating in the VHF or UHF band, it is important to remove the noise superposed on a commercial power line. In view of this point, a noise filter, which is actually a lowpass filter, is generally inserted in a power supply line of such an apparatus.

Referring to FIGS. 1 and 2, a conventional through type twin capacitor disclosed in the U.S. Pat. No. 4,370,698 for example, has an elliptic ceramic body 1 which has a pair or through holes 2 and 3 in its thickness. On the upper surface of the ceramic body 1, there are mounted a pair of separated electrodes 4 and 5 having the corresponding through holes and, on the lower surface thereof there is mounted a common electrode 6 having the corresponding through holes. A ground conductor 7 has a rectangular plate 7c and an elevated portion 7a. The plate 7c has four through holes 7c-1 to 7c-4 for fixing the capacitor assembly to a filter housing (not shown) by means of screws. The elevated portion 7a has a pair of through holes 9 and 10 which correspond to the holes 2 and 3 of the ceramic body 1, respectively. The elevated portion 7a also has plural through holes 7b along the peripheral line thereof. The common electode 6 is mounted on the elevated portion 7a of the ground conductor 7 so that the holes 9 and 10 overlap with the holes 2 and 3, respectively, and that the small holes 7b are positioned outside the ceramic body 1. A pair of elongated through conductors 11 and 12 have tab terminals 20 and 21, which are to be coupled with receptacle terminals of an external circuit (not shown). The rods 11 and 12 are inserted into the holes 9 and 10 of the ground conductor 7, and the holes 2 and 3 of the ceramic body 1, respectively. The conductor rods 11 and 12 are covered with flexible insulating tubes 15 and 16 made of rubber for instance, respectively, in order to assure the insulation between the common electrode 6 and the rods 11 and 12. The insulation tubes 15 and 16 also act to absorb the shrinkage stress in an injected filler 17 generated upon the heating and hardening process thereof, and to thus prevent the occurrence of cracks or the like in the hardened filler 17. The rods 11 and 12 also penetrate metallic caps 13 and 14, which are mounted on the electrodes 4 and 5, respectively. The rods 11 and 12 are then soldered to the caps 13 and 14, respectively. The caps 13 and 14 also have an portion having plural small holes 13a and 14a, respectively. Under the ground conductor 7, there is attached a hollow elliptic cylindrical plastic cover 8 so that it encloses the rods 11 and 12 with the tubes 15 and 16. The lower end of the cover 8 is designed to slightly project beyond the lower ends of the tubes 15 and 16. The cover B is an essentially elliptically shaped column having a pair of parallel long linear walls 8a and 8b, and a pair of half-circular walls 8d and 8e connecting said long linear walls. The cover 8 has a bridge 8c across the top portion of the same across the centers of said parallel long linear walls 8a and 8b so that said bridge 8c separates the space in the cover 8 into two substantially circular areas.

An insulating filler 17, which is for instance epoxy resin, surrounds the ceramic body 1, the caps 13 and 14 and the rods 11 and 12, as shown in FIG. 2. In the injecting process of the insulating filler 17, the capacitor body is covered with the cover 18, and the filler 17 is then injected in the cover 18 through the opening of the bottom of the cover 8. The insulating filler injected from the bottom passes through the small holes 7b provided on the ground conductor 7, and the small holes 13a and 14b provided on the caps 13 and 14, and thus, the inside area of the cover 18 is filled with the insulating filler 17. After the filler thus injected is hardened, the cover 18 is removed, and the twin capacitor assembly is completed. Consequently, the electrical insulation as well as the protection against oil, moisture and/or dust is assured by the injected epoxy resin.

Another conventional through type twin capacitor is illustrated in FIGS. 3 and 4 (see the Japanese Utility Model Laid-Open Publication No. 106330/85, for example). An elliptic ceramic body 31 has a pair of holes 32 and 33 in its thickness. On the upper surface of the ceramic body 31, tnere are mounted a pair of separated electrodes 34 and 35 having the corresponding through holes and, to the lower surface thereof there is attached a common electrode 36 having the corresponding through holes. A ground conductor 37 has a rectangular plate 37c as well as an elevated portion 37a. The plate 37c has four through holes 37c-1 to 37c-4 for fixing the capacitor to a filter housing (not shown). The elevated portion 37a has a generally elliptic through hole 37b. The common electrode 36 is mounted on the elevated portion 37a of the ground conductor 37. A pair of elongated through conductors 41 and 42 at the upper ends of which there are integrally formed tabs 41a and 42a, are inserted into metallic caps 39 and 40, the holes 32 and 33 and the elliptic hole 37b. The rods 41 and 42 are soldered to the metallic caps 39 and 40 which are mounted on the electodes 34 and 35, respectively. The rods 41 and 42 are also covered with flexible insulating tubes 44 and 45, respectively, for the same purpose as the tubes 15 and 16 described previously. Onto the ground conductor 37, there is attached a hollow elliptic cylindrical plastic cover 38 so that it encloses the lower portions of the rods 41 and 42 covered with the tubes 44 and 45. In this arrangement, it should be noted that the lower end of the cover 38 is designed to slightly project beyond the lower ends of the tubes 44 and 45, as shown in FIG. 4. On the ground conductor 37, there is mounted another hollow elliptic cylindrical plastic cover 43 so that it encloses the ceramic body 31, the caps 39 and 40 and the upper portions of the rods 41 and 42, as shown in FIG. 4.

Epoxy resin is injected through the openings of the lower cover 38 as well as the upper cover 43 therein. This is because the metallic caps 39 and 40 and the elevated portion 37a have no small through holes as shown in FIGS. 1 and 2, and the assembly is thereby perfectly separated into two housings. An insulating filler 46 surrounds the outside portions of the ceramic body 31 and the caps 39 and 40, and upper portions of the rods 41 and 42. Another insulating filler 47 surrounds the inside portion of the body 31 and the caps 39 and 40, and the centre portion of the rods 41 and 42 covered with by the tubes 44 and 45.

However, the conventional capacitor of FIGS. 1 and 2 has the following disadvantages. As described in the foregoing, the lower free end of the cover 8 is designed so as to slightly project beyond the lower ends of the silicon tubes 15 and 16. We found that in this arrangement, the discharge between the tabs 20, 21 and the ground conductor 7 may be initiated even when a relatively low voltage is applied to the capacitor. This discharge is notable if the capacitor is used under oily, dusty and/or moist circumstances such as a kitchen and a large amount of oil, dust and/or moisture is thus expected to be deposited on the tabs 20 and 21, the exposed bottom surface of the filler 17 and/or the cover 8.

Secondly, the filler 17 is injected through the opening of the cover 8 therebetween after the rods 11 and 12 having the tabs 20 and 21 are inserted into the holes 9 and 10, the holes 2 and 3 and the metallic caps 13 and 14, respectively. Therefore, in the filling process of the filler, there is the possibility that the insulating resin could be accidentally deposited onto the surfaces of the tabs 20 and 21. This is intended prevent the establishment of the electrical connection between the tabs and the receptacle terminals (not shown) which are attached to the tabs.

The other conventional through type twin capacitor of FIGS. 3 and 4 has the following disadvantages in addition to the same disadvantages as the capacitor of FIGS. 1 and 2. If the capacitor is used under oily, dusty and/or moist circumstances, oil, dust and/or moisture will be deposited on the exposed upper surface of the filler 46, the exposed surface of the rods 41 and 42, and the inner and outer surfaces of the upper cover 43. Especially, a large amount of oil, dust and/or moisture is apt to be deposited on the surface of the filler 46, because a recess is formed with the surface of the filler 46 and the perpendicular wall of the cover 43. This leads to the substantial decrease of the surface resistance of the path P1 from the rods 41 and 42 via the surface of the filler 46 and the inner and outer surfaces of the cover 43 to the ground conductor 37. In other words, the insulation creeping distance of the path substantially becomes short, as shown by the symbol P2 in FIG. 4 due to oil, dust and/or moisture deposited in the recess. The discharge initiating voltage depends on the degree of the insulation creeping distance. Consequently, when a large amount of oil or the like is deposited in the recess, the creeping distance or the surface resistance is directed to be decreased, and the discharge along said path is thus likely to be generated even with a relatively low voltage applied to the capacitor.

As to this disadvantage, it may be easily considered to remove the portion of the upper cover 43 upwardly projecting beyond the exposed surface of the filler 46 so that there is no recess into which oil or the like may be deposited. However, such means is not adequate, because the insulation creeping distance will be decreased by the creeping distance provided by the removed projecting portion of the upper cover 43.

Secondly, the conductive rods 41 and 42 are integrally formed with the tabs 41a and 42a, respectively. The tabs 41a and 42a are obtained by the compression molding. In this molding process, there is the possibility that some distortion is generated at the portions of the rods which are close to the tabs. The distortion of the conductive rods 41 and 42 may bring about ununiformity of the shrinkage stress in the injected filler 47. This leads to the deterioration of the heat properties of the capacitor.

SUMMARY OF THE INVENTION

It is an object of the present invention to overcome the disadvantages of conventional through type twin capacitors by providing a novel and improved through type twin capacitor.

It is also an object of the present invention to reduce the influence due to oil, dust and/or moisture deposited on a capacitor, and to thus improve the electric strength thereof.

It is a further object of the present invention to reduce the possibility that some insulating resin is accidentally deposited onto the tab terminals.

The above and other objects are attained by a through type twin capacitor comprising a ground conductor having a plate portion and an elevated portion elevated from the plate, the elevated portion having a though hole in the elevated direction; a column shaped body having a pair of separated electrodes deposited on the upper surface of the ceramic body as well as a common electrode deposited on the lower surface thereof, the ceramic body and the electrodes having two common through holes in their thickness, the ceramic body being mounted on the elevated portion so that the common electrode faces the elevated portion; a pair of metallic caps each of which has a hole and is mounted on the corresponding separated electrode; a pair of conductive rods penetrating the through holes of the caps, the common through holes of the ceramic body and the through hole of the elevated portion; a first insulating cover of a hollow column shape attached below the ground conductor; a second insulating cover of a hollow column shape attached on the ground conductor; a pair of insulating tubes covering the conductive rods so that the ends of the tubes project beyond the free end, of the first cover; and insulating fillers individually injected into the first and second covers.

BRIEF DESCRIPTION OF THE DRAWINGS

The foregoing and other objects of the present invention will be better understood by means of the following description and the accompany drawings wherein.

DESCRIPTION OF THE PREFERRED EMBODIMENTS

Figure 5:
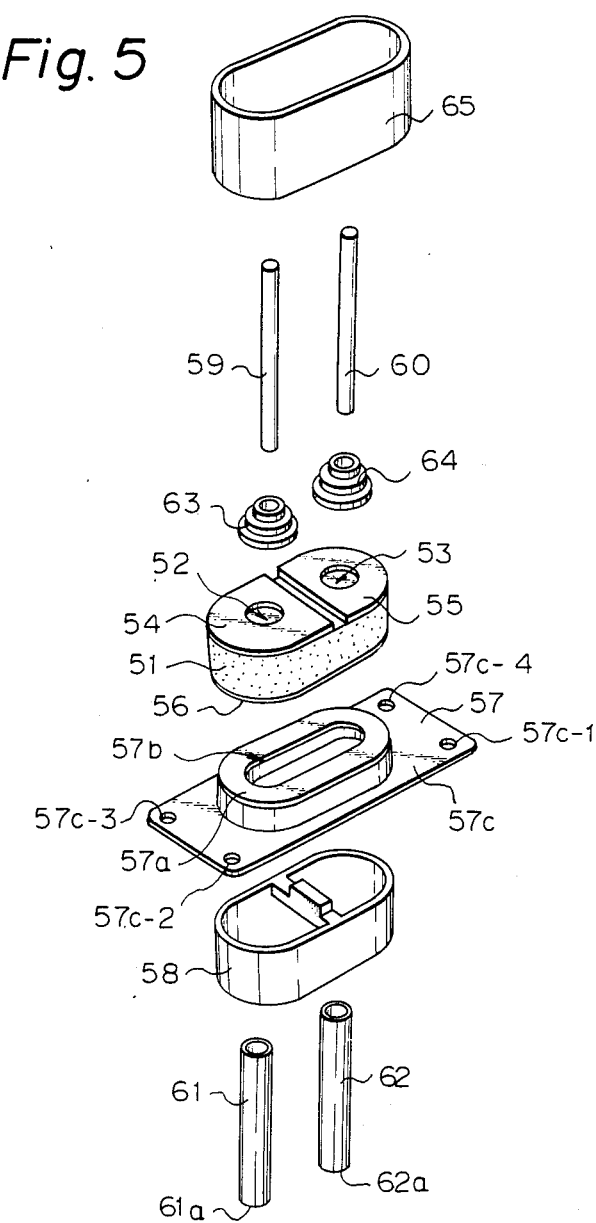
FIG. 5 is a disassembled perspective view of an embodiment according to the present invention.
Figure 6:
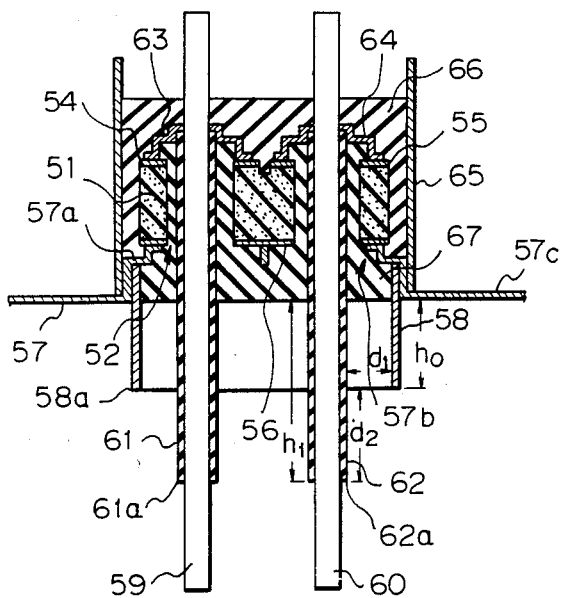
FIG. 6 is a vertical sectional view of the embodiment of FIG. 5.

Referring to FIGS. 5 and 6, an elliptic ceramic body 51 of a column shaped configuration has a pair of through holes 52 and 53 in its thickness. On the upper surface of the ceramic body 51, there are mounted a pair of separated surface electrodes 54 and 55 which have the corresponding through holes and, on the lower surface thereof there is mounted a common surface electode 56 having the corresponding through holes. A ground conductor 57 has a rectangular conductive plate 57c and an elevated conductive portion 57a. The plate 57c has four through holes 57c-1 and 57c-4 for fixing the capacitor to a filter housing (not shown) by means of screws. The elevated portion 57a has a generally elliptic through hole 57b at the center thereof. The common electode 56 is mounted on the elevated portion 57a of the ground conductor 57. A pair of metallic caps 63 and 64, each of which has a through hole, are attached to the surface electrodes 52 and 53 by soldering, respectively. A pair of cylindrical conductive rods 59 and 60 are inserted into the matallic caps 63 and 64, the through holes 52 and 53 of the ceramic body 51 and the elliptic through hole 57b of the ground conductor 57. The diameter of each of the holes 52 and 53 is larger than that of each conductive rod 59, 60. The diameter of the hole of each of the caps 63 and 64 is slightly larger than that of each rod. The rods 59 and 60 are soldered to the caps 63 and 64, respectively. A hollow elliptic cylindrical cover 58, made of ceramic material or insulating resin such as epoxy resin or polybutylene telephthalate, is attached to the ground conductor 57 so that the upper portions of the outer wall of the cover 58 engages with the inner surface of the elevated portion 57a. The cover 58 has the similar configuration to the cover 8 described in the foregoing. An upper hollow elliptic cylindrical cover 65, which may be made of the same material as that of the lower cover 58, is mounted on the upper surface of the ground conductor 57c so that the lower portion of the inner wall of the cover 65 engages with the outer wall of the elevated portion 57a. The upper cover 65 encloses the ceramic body 51, the metallic caps 63 and 64 and the portions of the conductive rods 59 and 60.

The conductive rods 59 and 60 are covered with flexible insulating tubes 61 and 62 such as silicone rubber, respectively. The upper ends of the insulating tubes 61 and 62 butt against the horizontal inner surface of the metallic caps 63 and 64. The other ends 61a and 62a of the insulating tubes 61 and 62 considerably project beyond the lower free end 58a of the lower cover 58. In other words, the insulating tubes 61 and 62 are extended beyond the lower end of the cover 58. That is, the level $h_0$ of the end of the cover 58 with respect to the ground conductor 57 is less than the level $h_1$ of the ends of the tubes 61 and 62 with respect to the ground conductor 57. Preferably, the degree of the projection of the tubes or the distance $d_2$ which corresponds to the difference between $h_0$ and $h_1$ is at least larger than the distance $d_1$ which is defined as the horizontal distance between the perpendicular wall of the cover 58 and the surface of the tube opposite to said wall.

In practice, the degree of the extension of the insulating tubes 61 and 62 depends upon several factors such as the voltage applied to the capacitor and the size of the capacitor. The extension of the insulating tubes 61 and 62 beyond the free end of the lower case 58 makes it possible to reduce the influence resulting from oil, dust and/or moisture deposited onto the lower side of the capacitor. In other words, the extension of the insulating tubes permits to decrease the possibility of the discharge between the lower portions of the conductive rods 59, 60 which are not covered with the tubes and the ground conductor 57, and to thus provide a higher electric strength of the capacitor. Of course, fillers 66 and 67 are filled into the upper and lower covers 65 and 58, respectively.

Figure 3:
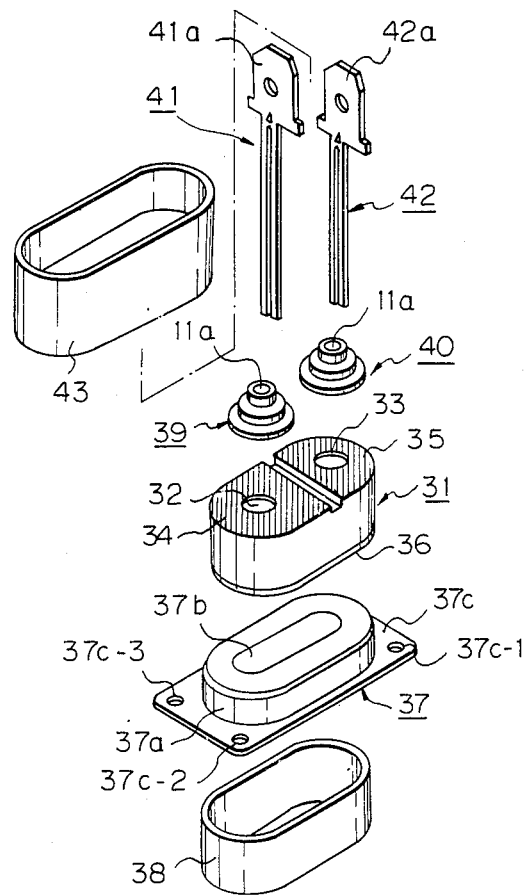
FIG. 3 is a disassembled perspective view of another conventional through type twin capacitor.
Figure 4:
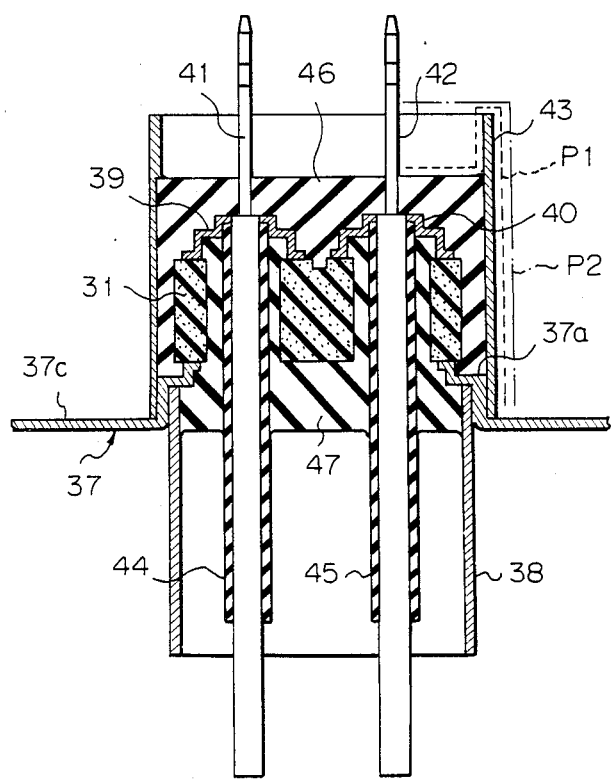
FIG. 4 is a vertical sectional view of the capacitor of FIG. 3.
Figure 7:
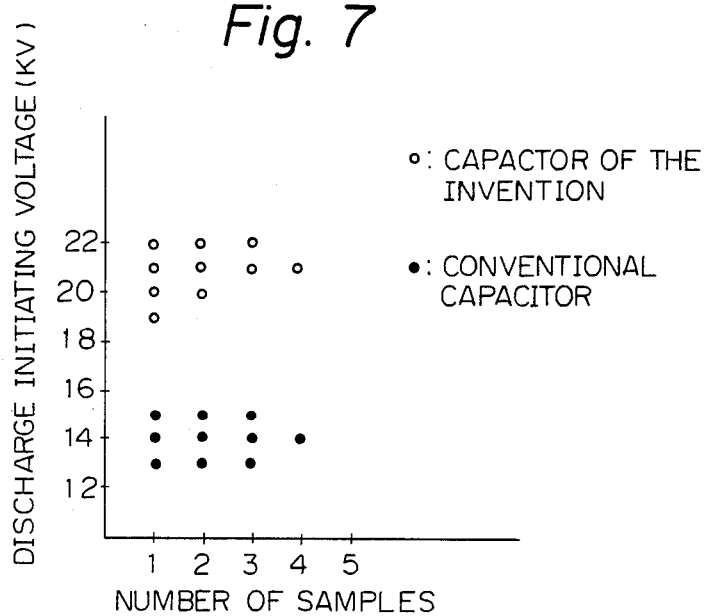
FIG. 7 is a view for explaining an advantage of the configuration of FIGS. 5 and 6, as compared with the conventional capacitor of FIGS. 1 and 2.

FIG. 7 is a graph for explaining an advantage of the invention, compared with the conventional capacitor as shown in FIGS. 3 and 4, on the basis of an experiment. In this figure, the ordinate shows the voltage at which the discharge is initiated, and the abscissa shows the number of ca corresponding to each of the discharge initiating voltages. The experiment used ten samples having the configuration as shown in FIGS. 5 and 6 as well as ten samples having the configuration as shown in FIGS. 3 and 4. Further, the frequency of the alternating voltage applied to the capacitor were set to 50 Hz. As apparent from this figure, the discharge initiating voltages of the conventional capacitors are in the range from 13 kV to 15 kV. On the other hand, the discharge initiating voltages of the present capacitors are in the range from the 19 kV to 22 kV. Therefore, it will be appreciated that the present invention makes it possible to considerably improve the electric strength of the capacitor.

Figure 1:
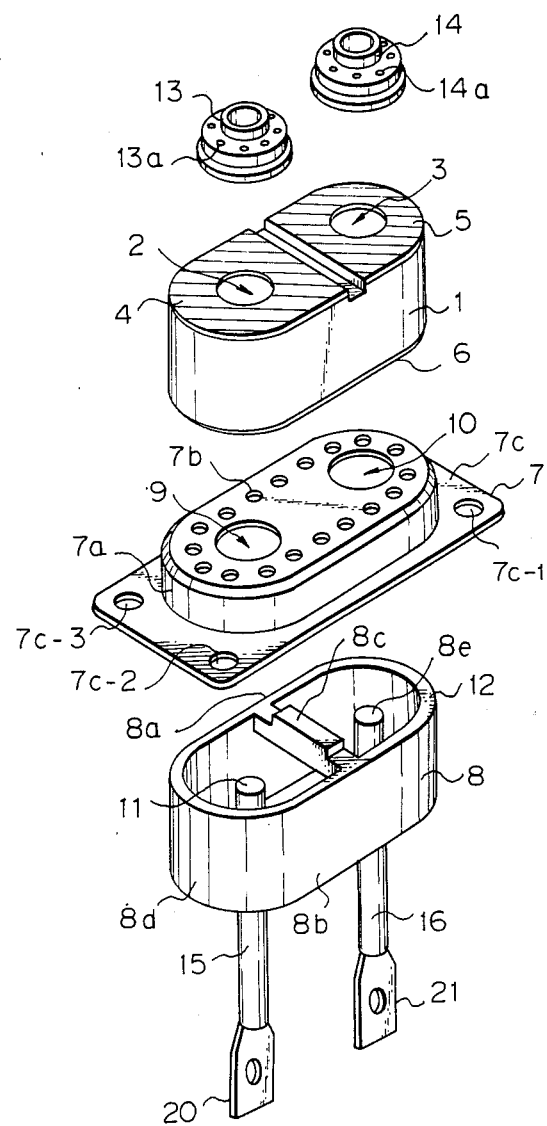
FIG. 1 is a disassembled perspective view of a conventional through type twin capacitor.
Figure 2:
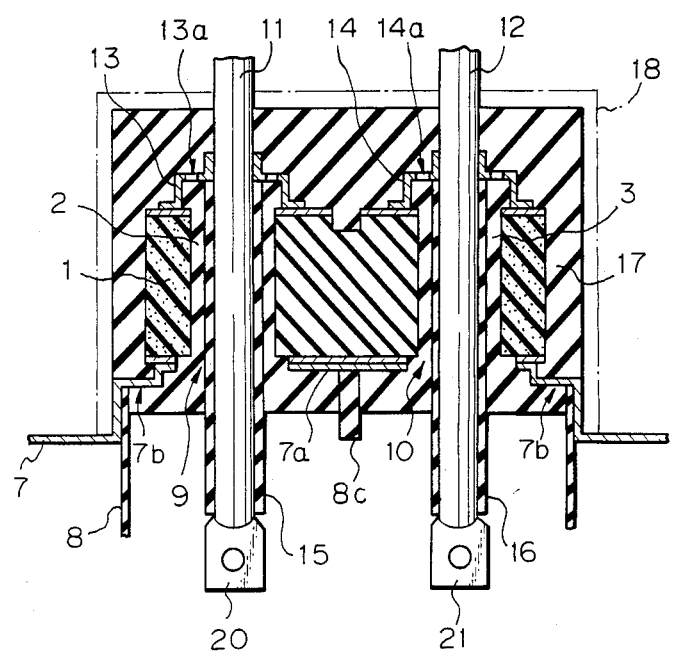
FIG. 2 is a vertical sectional view of the capacitor of FIG. 1.
Figure 8:
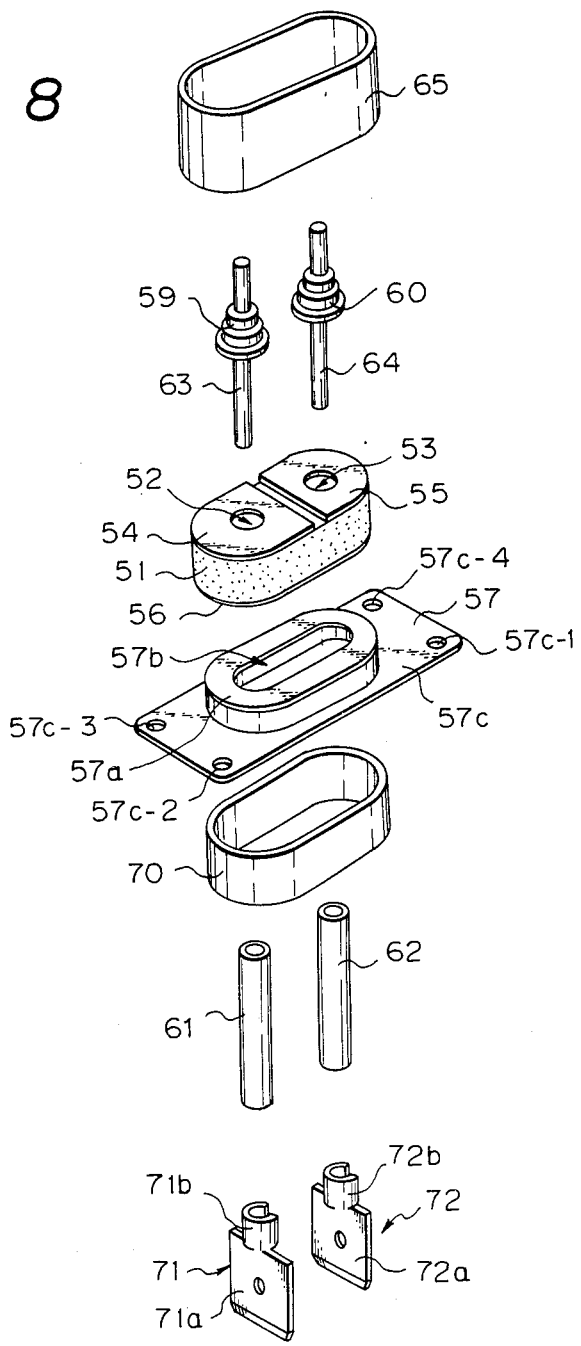
FIG. 8 is a disassembled perspective view of another embodiment according to the present invention.
Figure 9:
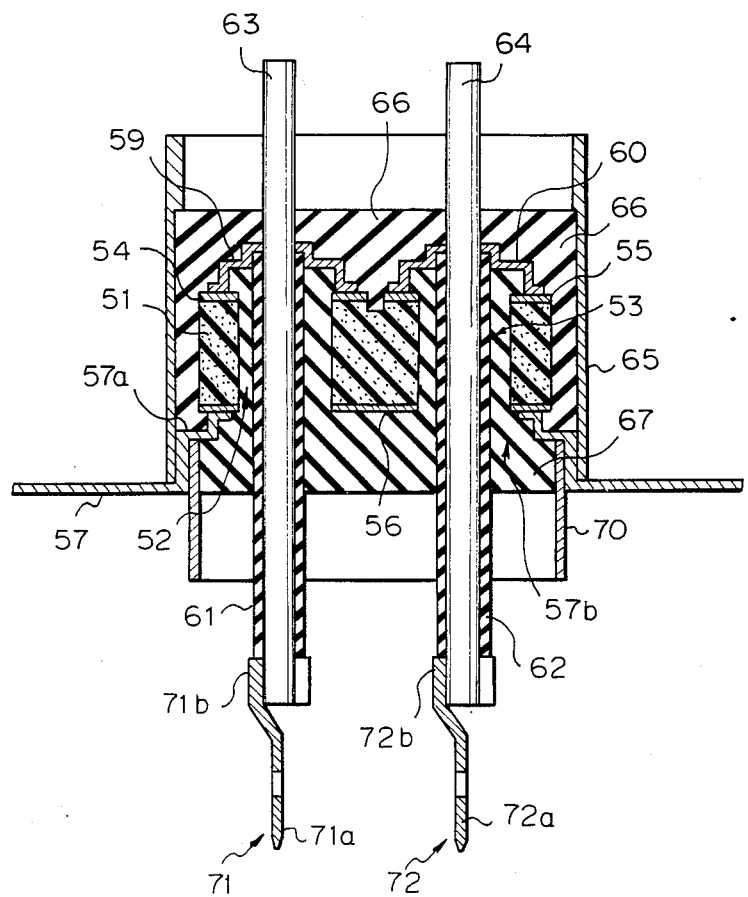
FIG. 9 is a vertical sectional view of the capacitor of FIG. 8.

Another embodiment according to the present invention is illustrated in FIGS. 8 and 9. In those figures, the same reference numerals as those in the previous drawings denote the same members as those in the previous drawings. An essential feature illustrated in FIGS. 8 and 9 is that tab terminals 71 and 72 and conductive rods 63 and 64 are separately formed, respectively. It should be noted that the tabs 21 and 22 of the conventional capacitor in FIGS. 1 and 2 are integral with the rods 11 and 12, respectively. The rods 63 and 64 with the caps 59 and 60 are inserted into the through holes 52 and 53 of the ceramic body 51 and the hole 57b of the ground conductor 57. The rods 63 and 64 are covered with the insulating tubes 61 and 62, respectively. Of course, those tubes are considerably extended beyond the free end of the lower case 70 in order to improve the electric strength of the capacitor. The tabs 71 and 72 are then attached to the rods 63 and 64, respectively. The tab 71 has a plate 71a and a C-shaped portion 71b with its diameter slighty larger than that of the cylindrical rod 63. The C-shaped portion 71b is coupled with the lower end of the rod 63, and is fixed thereto by means of welding or crimping. Likewise, the tab 72 has a plate portion 72a and a C-shaped portion 72b. The attachment of the tabs 71 and 72 to the corresponding rods 63 and 64 is done after the insulating fillers 66 and 67 are filled in the upper case 65 and the lower case 70, respectively. It is therefore possible to avoid during the injecting operation of the filler, epoxy resin of the filler being accidentally deposited onto the tabs 71 and 72.

Figure 10:
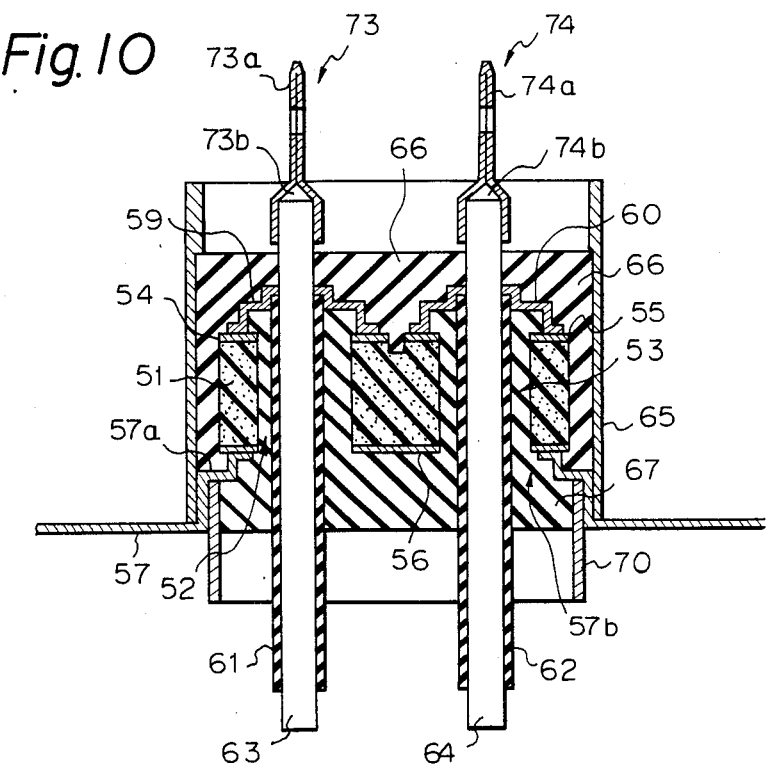
FIG. 10 is an variation of the configuration in FIGS. 8 and 9.
Figure 11:
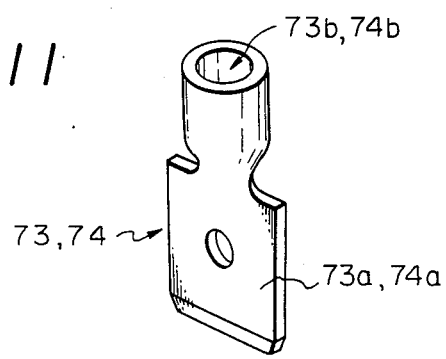
FIG. 11 is a perspective view of a tab terminal used in capacitor of FIG. 10.

FIG. 10 illustrates a variation of the configuration of FIGS. 8 and 9, in which tab terminals 73 and 74 are attached to the upper ends of the conductive rods 63 and 64 instead of the tabs 71 and 72, respectively, which are attached to the lower ends thereof in the capacitor of FIGS. 8 and 9. As illustrated in FIG. 11, the tabs 73 and 74 have plate portions 73a and 74a as well as hollow cylindrical portions 73b and 74b, which accommodate the upper en of the rods 63 and 64, respectively. Of course, the operation of the attachment operation of the tabs 73 and 74 to the rods 63 and 64 is done after the filling operation of the filler 66.

According to the embodiments of FIGS. 9 and 10, the productivity on producing the two different types of capacitors will be improved, because the tab terminals can be attached to either side of edges of the conductive rods.

In addition, of nonuniformity shrinkage stress in the filler due to the distortion of the rods can be avoided, because the tab terminals 73 and 74 are attached to the rods 63 and 64, respectively, after the fillers 66 and 67 are injected.

Figure 12:
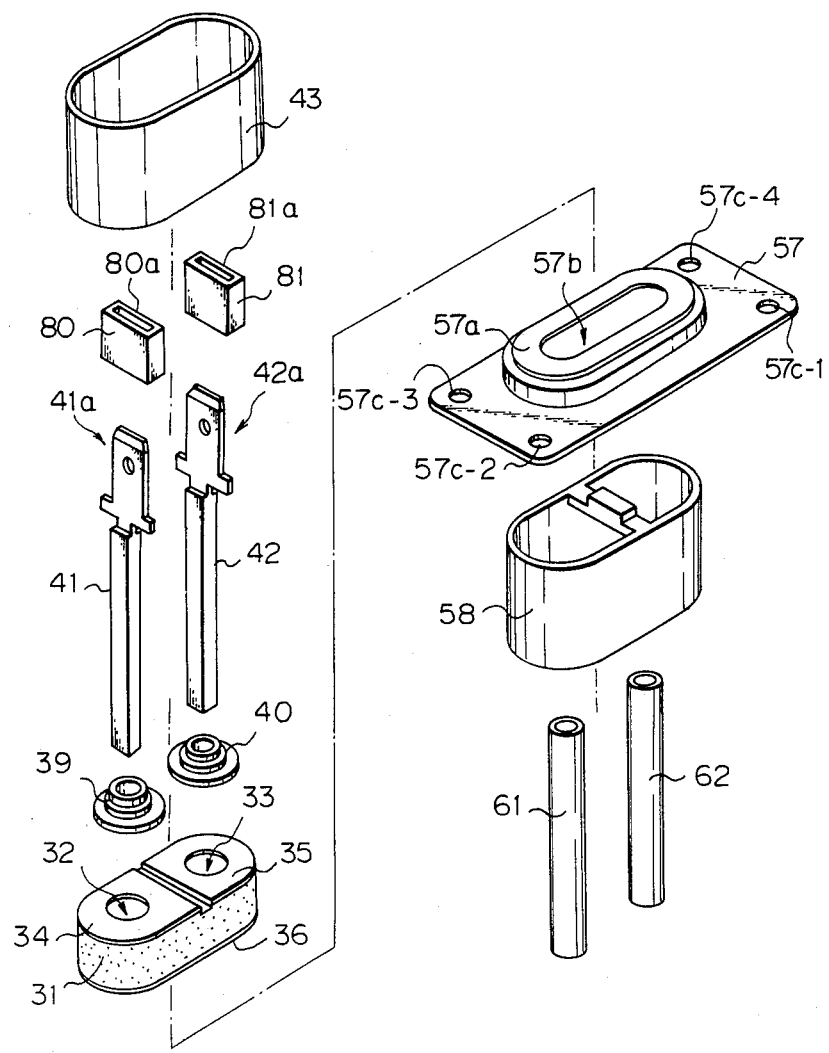
FIG. 12 is a disassembled perspective view of a still another embodiment according to the present invention.
Figure 13:
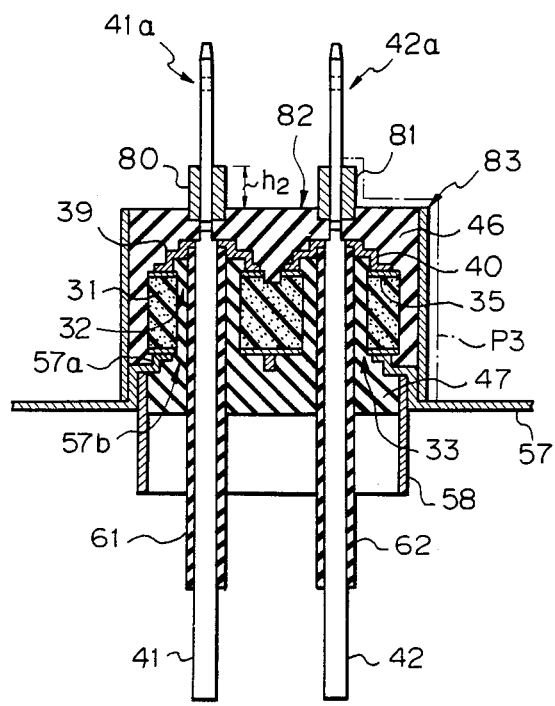
FIG. 13 is a vertical sectional view of the capacitor of FIG. 13.
Figure 14:
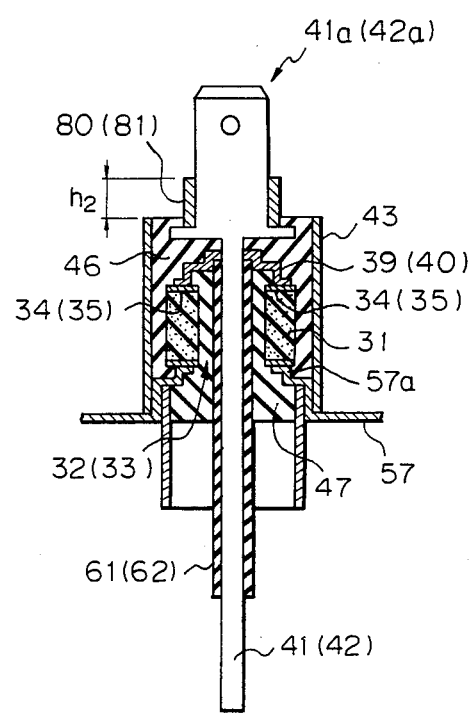
FIG. 14 is another vertical view of the capacitor of FIG. 12.

A still further embodiment is illustrated in FIGS. 12 to 14, in which the same reference numerals as those in the previous drawings designate the same members as those therein. An essential feature of this embodiment is the presense of insulating covers or sleeves 80 and 81 which are attached to the tab terminals 41a and 42a of the conductive rods 41 and 42, respectively. The insulating sleeves 80 and 81 are made of inorganic insulating material such as ceramics, thermoset resin such as epoxy resin, or silicone rubber. The insulating sleeves 80 and 81 have rectangular through holes 80a and 81a which the tabs 80 and 81 penetrate, respectively. The lower edge of each of the insulating sleeves 80 and 81 is embedded in the filler 46 which is filled in the upper case 43. On the other hand, the insulating sleeves 80 and 81 upwardly project beyond the surface of the filler 46 by the height $h_2$, as shown in FIG. 13. The level of the filler 46 coincides with that of the free end of the upper case 43, although the free end of the conventional upper cover 43 upwardly projects over the upper surface of the filler 46, as described previously. That is, no recess containing the surface of the filler 82 as the bottom of the recess is provided in according to the present embodiment. Consequently, it is then difficult to deposit oil, dust and/or moisture on the surface of the filler 82. In addition, the insulation creeping distance of the tab terminals 41a and 42a and the ground conductor 57 is sufficiently elongated due to the insulating sleeves 80 and 81, as shown by the symbol P3 in FIG. 13. As a result, the present embodiment makes it possible to prevent the decrease of the electric strength, resulting from oil, dust and/or moisture.

An example will be given of an advantage of the embodiment of FIGS. 12 to 14, as compared with the conventional capacitor of FIG. 3, on an basis of the experiment. Three samples of each of the present and conventional capacitors were examined. The experiment was effected under the condition that a high voltage more than 20 kV was repeatedly applied to the sample with some moisture deposited on the surface of the filler and the upper case thereof, and the number applications of the voltage repeated until breakdown of the sample Table 1 shows an experimental result of the conventional capacitor, while Table 2 shows one of the present embodiment.

TABLE 1

| Sample No. | Number of Application of Voltage Repeated until Breakdown |
|---|---|
| 1 | 6 |
| 2 | 5 |
| 3 | 7 |

TABLE 2

| Sample No. | Number of Application of Voltage Repeated until Breakdown |
|---|---|
| 1 | more than 120 |
| 2 | more than 120 |
| 3 | more than 120 |

It will be apparent from the above tables that the configuration illustrated in FIGS. 12 to 14 is very effective to increase the electric strength of the capacitor.

From the foregoing, it will now be apparent that a novel and improved through type twin capacitor has been proposed. It should be understood of course that embodiments disclosed are merely illustrative and are not intended to limit the scope of the invention. Reference should be made to the appended claims, therefore, rather than the specification as indicating the scope of the invention.

What is claimed is:

1. A through type twin capacitor comprising:
a ground conductor having a plate portion and an elevated portion elevated from the plate, the elevated portion having a through hole,
a column shaped ceramic bosy having a pair of separated electrodes deposited on the upper surface of the ceramic body as well as a common electrode deposited on the lower surface thereof, the ceramic body and the electrodes having two common through holes in their thickness direction, the ceramic body being mounted on the elevated portion of the ground conductor so that the common electrode faces the elevated portion,
a pair of metallic caps each of which has a through hole and is mounted on the corresponding separated electrode,
a pair of conductive rods penetrating the through holes of the caps, the common through holes of the ceramic body and the through hole of the elevated portion of the ground conductor,
a first insulating cover of a hollow column shape attached below the ground conductor,
a second insulating cover of a hollow column shape attached above the ground conductor,
a pair of insulating tubes on the respective conductive rods, said tubes covering said rods from where they emerge from the bottom of said caps to a position beyond the end of the first cover, the distance $d_2$ by which the ends of said tubes extends beyond the end of the first cover being at least larger than the distance $d_1$ between the wall of the first cover and the surface of the tube opposite the wall, so as to provide extra discharge protection, and
insulating fillers individually injected into the first and second covers.

2. A through type twin capacitor according to claim 1, wherein respective tab terminals, which are not formed integrally with said rods, are provided for an external connection and are attached to either end of each of the conductive rods.

3. A through type twin capacitor according to claim 1, wherein the conductive rods are partially coverred, above the caps, with insulating sleeves in such a way that one ends of the sleeves are embedded in the filler within the second cover, and the other ends thereof project beyond the exposed surface of the filler in the second cover.

4. An through type twin capacitor according to claim 3, wherein the level of the free end of the second cover coincides with the level of the exposed surface of the filler in the second cover.

* * * * *